United States Patent [19]
Alexandrov et al.

[11] 3,738,393
[45] June 12, 1973

[54] GATE FOR PIPE CONDUITS OF PNEUMATIC RABBIT CONVEYORS

[76] Inventors: Adolf Moritsovich Alexandrov, Federativny prospekt, 6, korpus 3, kv. 8, Moscow; Ippolit Davidovich Suladze, prospekt Chavchavadze, 11, kv. 41, Tbilisi; Ruben Dzhangirovich Balaian, Volkovskaya ulitsa, 9, kv. 31, Ljubertsky Moskovskaya oblast; Vladimir Efimovich Aglitsky, Zatsepsky val, 6/13, kv. 61, Moscow; Avtandil Semenovich Kakhniashvili, ulitsa Eliava, 37, kv. 41, Tbilisi; Ilia Solomonivich Kantor, Malo-Moskovskaya ulitsa, 31, kv. 45, Moscow; Vazha Venediktovich Dzhanelidze, prospekt Plekhanova, 140, Tbilisi; Matvei Iosifovich Rozenfeld, Borisovskaya ulitsa, 21, kv. 49, Moscow, all of U.S.S.R.

[22] Filed: Feb. 12, 1971

[21] Appl. No.: 114,867

[30] Foreign Application Priority Data
Apr. 29, 1970 U.S.S.R. ............................ 1426374

[52] U.S. Cl. .................. 138/94.3, 251/197, 251/326
[51] Int. Cl. .......................................... F16l 55/10
[58] Field of Search ........................... 138/94.3, 94; 251/197, 200, 326, 329

[56] References Cited
UNITED STATES PATENTS

| 3,266,525 | 8/1966 | Wolter | 138/94.3 |
| 1,762,818 | 6/1930 | Hoffman | 138/94.3 |
| 1,778,070 | 10/1930 | Fisk | 138/94.3 |
| 3,576,198 | 4/1971 | Bessat | 251/326 X |

FOREIGN PATENTS OR APPLICATIONS

| 1,096,232 | 1/1955 | France | 138/94.3 |
| 1,918,875 | 11/1969 | Germany | 251/326 |

*Primary Examiner*—Herbert F. Ross
*Attorney*—Holman & Stern

[57] ABSTRACT

A gate for pipe conduits of pneumatic rabbit conveyors, in which two rigidly interconnected branch pipes having a diameter corresponding to that of the pipe conduit accommodate therebetween, a gate valve having an opening for the passage of rabbits and working fluid and being displaceable with the aid of a drive. The branch pipes are interconnected by means of tie pieces, while the gate valve is defined by a section of pipe, having a diameter corresponding to that of the branch pipes, and two packing supporting sides.

3 Claims, 5 Drawing Figures

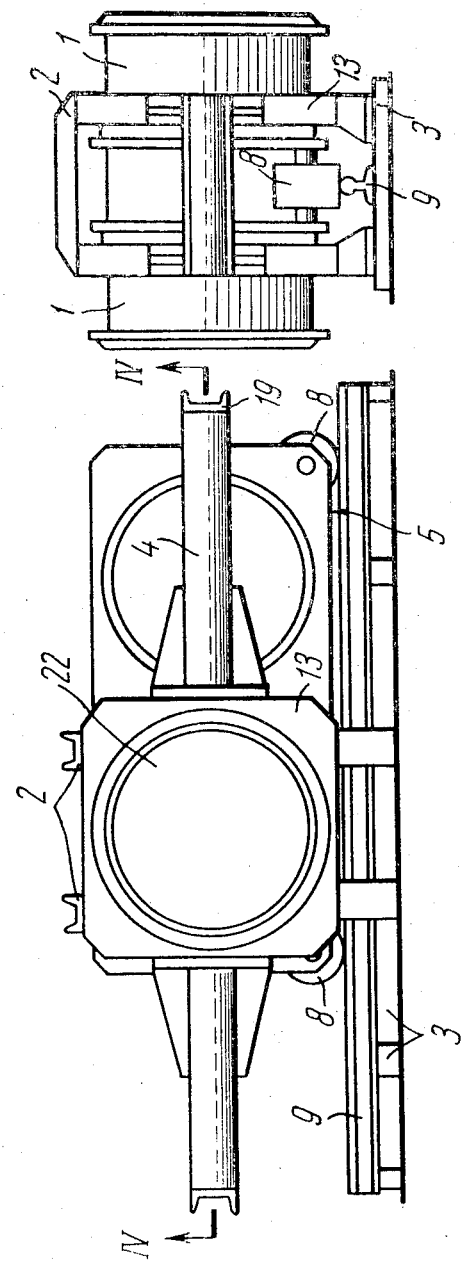

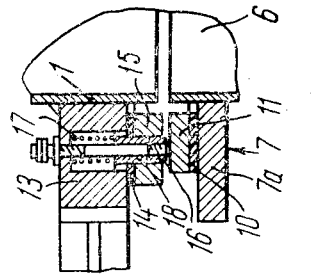
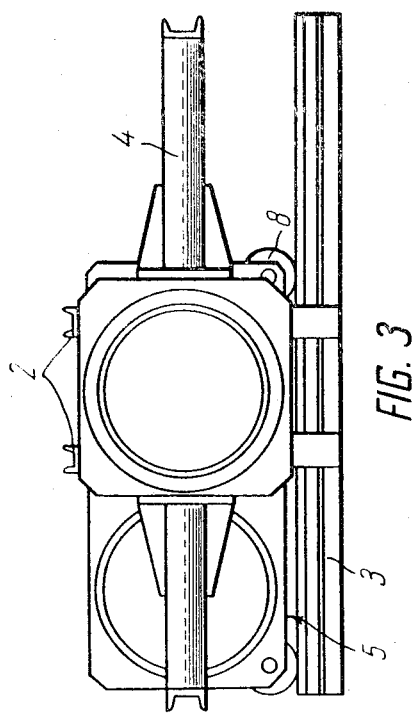
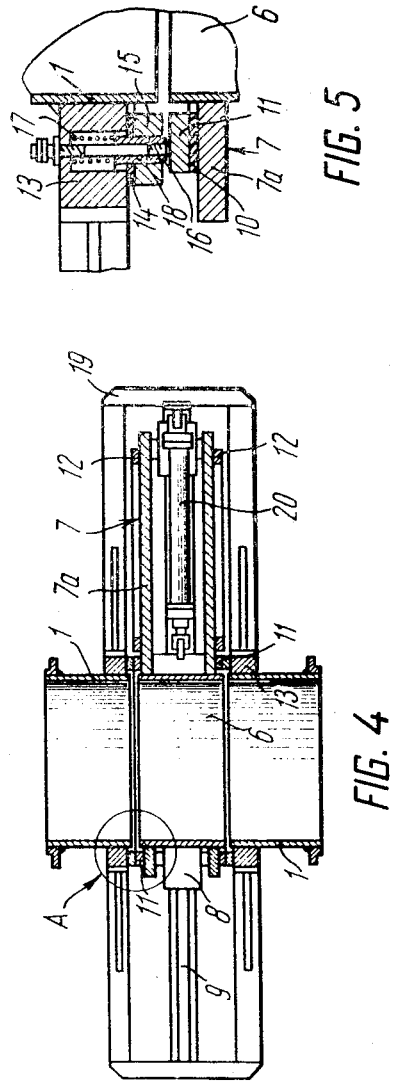

3,738,393

GATE FOR PIPE CONDUITS OF PNEUMATIC RABBIT CONVEYORS

BACKGROUND OF THE INVENTION

The present invention relates to the field of pneumatic transportation and, more particularly, to gates for pipe conduits of pneumatic rabbit conveyors.

Prior Art

Known in the art are gates for pipe conduits of pneumatic rabbit conveyors, comprising two stationary branch pipes rigidly interconnected by the housing of the gates and having a diameter corresponding to that of the main pipe conduit, with the branch pipes accommodating therebetween a gate valve which has an opening adapted for the passage of rabbits and working fluid and which is displaceable with the aid of a drive.

The known gates suffer from a complex design of their housings, a considerable consumption of metal, large dimensions and unsufficient speed of action.

It is an object of the present invention to provide a gate for pipe conduits possessing reduced dimensions, a lightweight structure and, as a result, high speed of action.

SUMMARY OF THE INVENTION

In the accomplishment of the above and other objects of the invention, in a gate for pipe conduits of pneumatic rabbit conveyors, comprising two rigidly interconnected branch pipes having a diameter corresponding to the diameter of the main pipe conduit and accommodating therebetween a gate valve having an opening for the passage of rabbits and working fluid and being displaceable by means of a drive, according to the invention, the branch pipes are rigidly interconnected by means of tie pieces, while the gate valve is defined by a pipe section having a diameter corresponding to that of the immovable branch pipes, and two packing sides.

It is expedient that the packing sides of the gate valve be defined by plates, with each of the plates carrying two rings rigidly secured thereon in locations corresponding to the opened and closed positions of the gate, and to which rings in the positions are pressed metal packing rings mounted on the branch pipes.

It is likewise expedient that the gate valve drive, constituted by a hydraulic jack, be arranged between the packing sides of the gate valve.

It is desirable that between the sides of the gate valve, rollers be mounted for the displacement of the gate valve along a rail.

The present invention provides a gate for pipe conduits of pneumatic rabbit conveyors, which requires a relatively low consumption of metal, is of small dimensions and high speed of action, thus resulting in a high conveyor capacity.

BRIEF DESCRIPTION OF THE DRAWINGS

The present invention will be more apparent upon considering a detailed description of an exemplary embodiment thereof, with due reference to the accompanying drawings, in which:

FIG. 1 is a front view illustrating a gate for pipe conduits of pneumatic rabbit conveyors, in accordance with the present invention, with a gate valve open, FIG. 2 is a side view of the gate shown in FIG. 1, FIG. 3 is a view similar to FIG. 1 with the gate valve closed, FIG. 4 is a view taken along the line IV—IV of FIG. 1, the view looking in the direction of the arrows; and FIG. 5 is an enlarged view of the circled area A in FIG. 4.

Referring to FIGS. 2, 4 and 5, the gate includes two immovable branch pipes 1 connected to the linear portion of the pipe conduit and each having a diameter corresponding to the diameter of the pipe conduit. The branch pipes are interconnected from above by means of tie pieces 2 (FIGS. 1, 2 and 3), from below by a frame 3, and in the middle by a frame 4 (FIGS. 1 and 3). Arranged in a space or lot between the opposed ends of the branch pipes 1 is a horizontally displaceable gate valve denoted generally 5 which is essentially a rigid structure comprising a section 6 of pipe (FIGS. 4 and 5) and longitudinal sides 7 viewed in the direction of the gate valve movement between which sides are arranged two axle-mounted rollers 8 fore and aft of the valve, with the (FIGS. 1, 2 and 3) rollers riding on a horizontal rail 9 (FIG. 2) mounted on the lower frame 3.

The sides 7 are defined by two spaced apart parallel plates 7a, each of which carries on its outer surface two rings 11 and 12 (FIGS. 4, 5) rigidly attached thereto on spacers 10 (FIG. 5) and arranged to correspond to the closed and opened positions of the gate.

To the branch pipes are secured plates 13, each carrying a single ring 15 rigidly attached thereto on spacers 14 (FIG. 5), with each of rings 15 having an annular recess adapted to accommodate a movable metal sealing ring 16 which, under the effect of a plurality of circumferentially arranged springs 17 through bushings 18, is always pressed against the ring 11 or 12 of the gate valve 5. Secured to a cross-piece 19 (FIG. 4) provided on the middle frame 4 is a hydraulic jack 20 which serves as the gate drive.

The gate according to the present invention operates in the following manner:

In the opened position of the gate, as shown in FIGS. 1 and 4, the immovable branch pipes 1 and the pipe section 6 of the gate valve define an internal cylindrical surface with small structural gaps 21, providing for an unobstructed passage of rabbits or trains of rabbits through an opening 22 (FIG. 1) of the gate valve. When in this position, the sealing between the inner space of the pipe conduit and the environment is attained by the tight pressing the rings of 15 against the rings 11 of the gate valve 5. The pipe conduit is closed with the aid of the hydraulic jack 20 under whose effect the gate valve 5 moves on the rollers 8 along the rail 9 to the extreme left-hand (according to the drawing) position. When in this position, the pipe conduit is closed by the sides 7, while the sealing is ensured through the tight pressing of the rings 15 against the rings 12.

We claim:

1. A gate for pipe conduits of pneumatic conveyors, including two branch pipes, each branch pipe having a diameter corresponding to the diameter of the pipe conduit, tie pieces rigidly interconnecting the branch pipes in aligned relationship to provide a wide slot therebetween, a gate valve movable in the slot to opened and closed positions including a pipe section having a diameter corresponding to the diameter of each branch pipe, and two spaced apart parallel side plates secured to the pipe section and serving as closing means, two rings rigidly secured to each side plate, one ring being located to correspond to a closed position of the gate valve and the other ring to an opened position of the gate valve, a metal sealing ring mounted on each branch pipe for movement relative thereto, means operably related to each sealing ring to press the sealing ring into tight engagement with the ring of each side plate of the gate valve corresponding to the closed or opened position of the gate valve, and drive means located between the side plates operably connected to the gate valve to move the gate valve to the opened and closed positions in the slot.

2. The gate as claimed in claim 1 in which the drive means comprises a hydraulic jack, a horizontal rail located below the slot between the branch pipes and rollers supported by the side plates for travel along the rail.

3. The gate as claimed in claim 1 including a further ring rigidly attached to each branch pipe, said further ring having an annular recess accommodating the sealing ring, and the means to press the sealing ring including a plurality of circumferentially arranged springs located in the recess and a bushing between each spring and the sealing ring.

* * * * *